United States Patent [19]

Materazzi

[11] Patent Number: 4,599,977
[45] Date of Patent: Jul. 15, 1986

[54] INLET MANIFOLD FOR NORMAL INDUCTION OR SUPERCHARGED INTERNAL COMBUSTION ENGINES FEATURING INDIRECT FUEL INJECTION

[75] Inventor: Nicola Materazzi, Maranello, Italy

[73] Assignee: Ferrari Societa' per Azioni Esercizio Fabbriche Automobili e Corse, Modena, Italy

[21] Appl. No.: 688,830

[22] Filed: Jan. 2, 1985

[30] Foreign Application Priority Data

Jan. 27, 1984 [IT] Italy .............................. 40009 A/84

[51] Int. Cl.$^4$ .......................................... F02M 57/00
[52] U.S. Cl. .................... 123/52 M; 123/470
[58] Field of Search .................. 123/52 M, 470–472

[56] References Cited

U.S. PATENT DOCUMENTS 3,635,201   1/1972   High ................................ 123/52 M

FOREIGN PATENT DOCUMENTS 119919   7/1983   Japan ................................ 123/52 M
2082252   3/1982   United Kingdom ................ 123/470

Primary Examiner—Craig R. Feinberg
Attorney, Agent, or Firm—Lowe Price LeBlanc Becker & Shur

[57] ABSTRACT

Each intake passage of the manifold is divided into two symmetrical passages (3 and 3') which taper gently down toward a restriction (6) beneath the point (7) where fuel is injected. The axes of the two passages converge in V-formation toward the injection point and the division is created by a web (5) incorporated into the initial stage of the intake passage and exhibiting an upturned pear-drop profile when seen in section.

6 Claims, 14 Drawing Figures

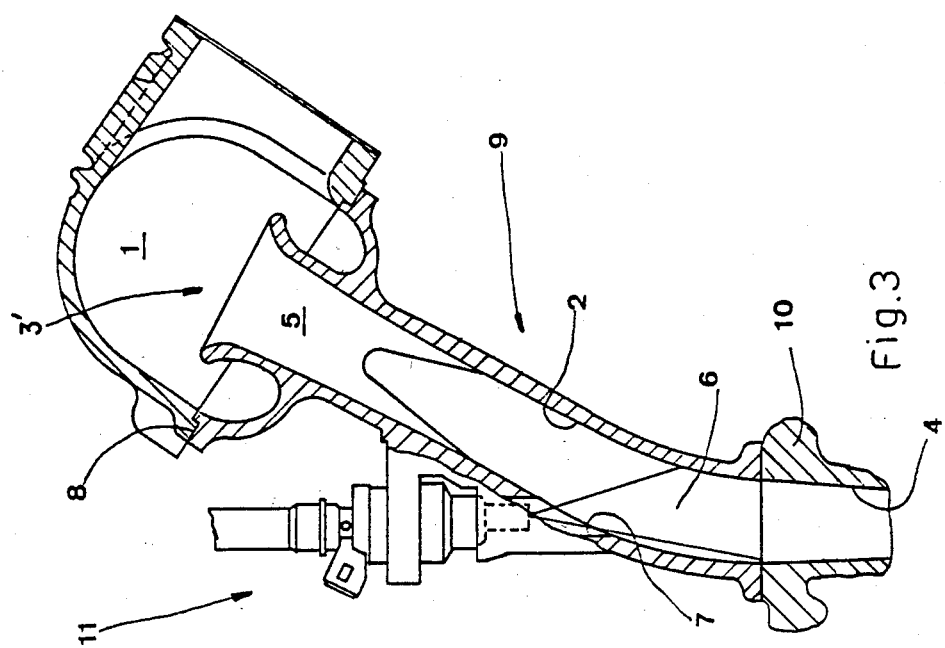
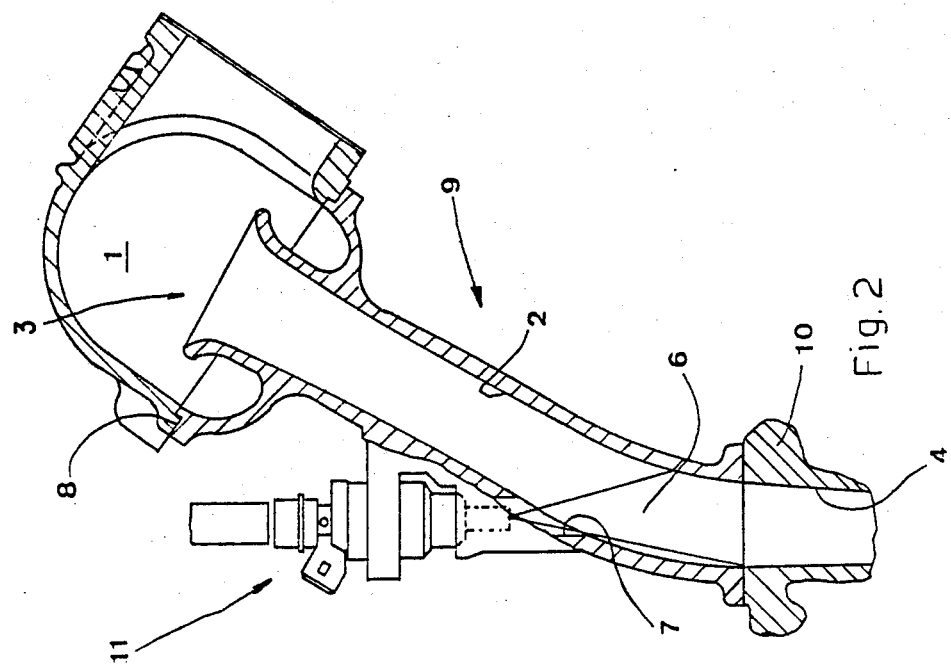

INLET MANIFOLD FOR NORMAL INDUCTION OR SUPERCHARGED INTERNAL COMBUSTION ENGINES FEATURING INDIRECT FUEL INJECTION

The invention described herein relates to an inlet manifold for normal air-induction or supercharged internal combustion engines featuring indirect fuel injection—that is, a part for internal combustion engines fitted to automobiles in particular, both of the normal induction and of the supercharged type, wherein fuel is injected into the intake passages preceding the engine cylinders' combustion chambers. The prior art embraces manifolds in which each inlet section consists of a single intake passage admitting air and air-and-fuel mixture into a relative combustion chamber; such intake passages needing to be as narrow as practicable in order to avoid levels of emission in excess of those tolerated by environmental standards. However, whilst pollution can be limited at low engine speeds by virtue of increased turbulence, the same object is not achieved at the higher engine speeds. Moreover, the pollution hazard from the inlet manifold is greatest at idling speed, due to the much-decreased proportion of air, and to its flow-pattern, which is laminar in relation to the intake passage axis. This type of flow inhibits efficient mixture, especially in passages of larger cross-sectional area, the results of which are loss of efficiency, and exhaust emissions containing considerable quantities of matter escaping combustion.

The prior art thus described stands in need of vast improvement, with regard in particular to the possibility of eliminating narrow air-intake passages whilst maintaining emission levels well within those laid down by environmental standards. From the foregoing, one may discern the need for a solution to the technical problem of embodying an inlet manifold wherein each intake passage responds to the necessity for keeping emission levels within standard limits, whilst permitting the generous air-flow required for high engine speeds and high output, this being achieved by increasing turbulence in the air intake passage without any narrowing-down of its cross-sectional area—on the contrary, widening the area where necessary.

The invention provides an inlet manifold for normal induction or supercharged internal combustion engines featuring indirect fuel injection, wherein each cylinder intake section comprises a chamber supplying normally-induced or supercharged air, an intake passage wherein fuel and air are mixed, and a final mixture inlet passage to the cylinder, located within the cylinder head, wherein each intake passage is divided into two symmetrical divided passages tapering toward a restriction which is located beneath the point where fuel is injected; the axes of said passages converging in V-formation down toward the point of injection; the division of the intake passage being obtained by a transverse web, or baffle located at the initial stage of the intake passage and exhibiting an elongated inverted pear-drop profile when seen in cross-section. The angle separating the axes of said divided pasages in converging in V-formation down toward said point of injection is determined by the distance between cylinder centers, but would normally be of the order of 12° to 30°.

Seen in section, the baffle exhibits an inverted pear-drop shape having a wide curvature uppermost, embodied such as to create said two divided passages whose cross-section gradually diminishes—producing a taper of between 3° and 13°—toward the restriction where mixture of the fuel and air is brought about, below the fuel injector nozzle. Each of said divided passages is countersunk at the top, according to the curvature of the top end of said baffle.

Advantages obtained with the invention are: markedly reduced exhaust emission levels even at low engine speeds; an inlet configuration conducive to high performance; ease and economy of manufacture; increased output and reduced fuel consumption. Comparative tests carried out under identical conditions on a V8 engine fitted (a) with a conventional inlet manifold and (b) with an inlet manifold according to the invention, produced the following results:

(a) conventional inlet manifold:

|  | CO % | HC (ppm) |
|---|---|---|
| right hand bank | 1 | 350 |
| left hand bank | 0,9 | 340 |
| total emission | 1 | 350 |

(b) inlet manifold according to the invention:

|  | CO % | HC (ppm) |
|---|---|---|
| right hand bank | 0,8 | 120 |
| left hand bank | 0,7 | 110 |
| total emission | 0,7 | 110 |

It will be seen that combustion is more complete in the latter instance, thanks to the better mixture of fuel and air produced.

An example embodiment of the inventio will now be described with the aid of the four attached sheets of drawings, in which:

FIG. 2 is the section through II—II in FIG. 1 which illustrates one of the two divided intake passages which converge toward and unite in the fuel mixture passage;

FIG. 3 is the section through III—III in FIG. 1 which illustrates the remaining intake passage of said two divided passages which converge toward and unite in the same fuel mixture passage;

Figure 12:
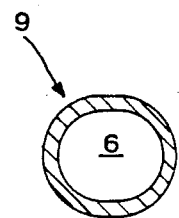
Figure 13:
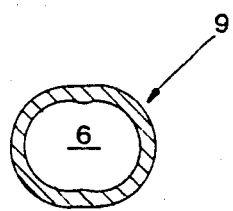
Figure 14:
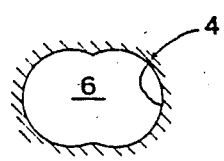

In FIGS. 6, 7, 8, 9, 10 and 11, each section is taken through the converging axes of the two divided intake passages, whilst in FIGS. 12, 13 and 14, sections are taken through the fuel mixture passage. The section through XII—XII represents the narrowest point of the entire intake, this located immediately beneath the injector nozzle.

Figure 1:
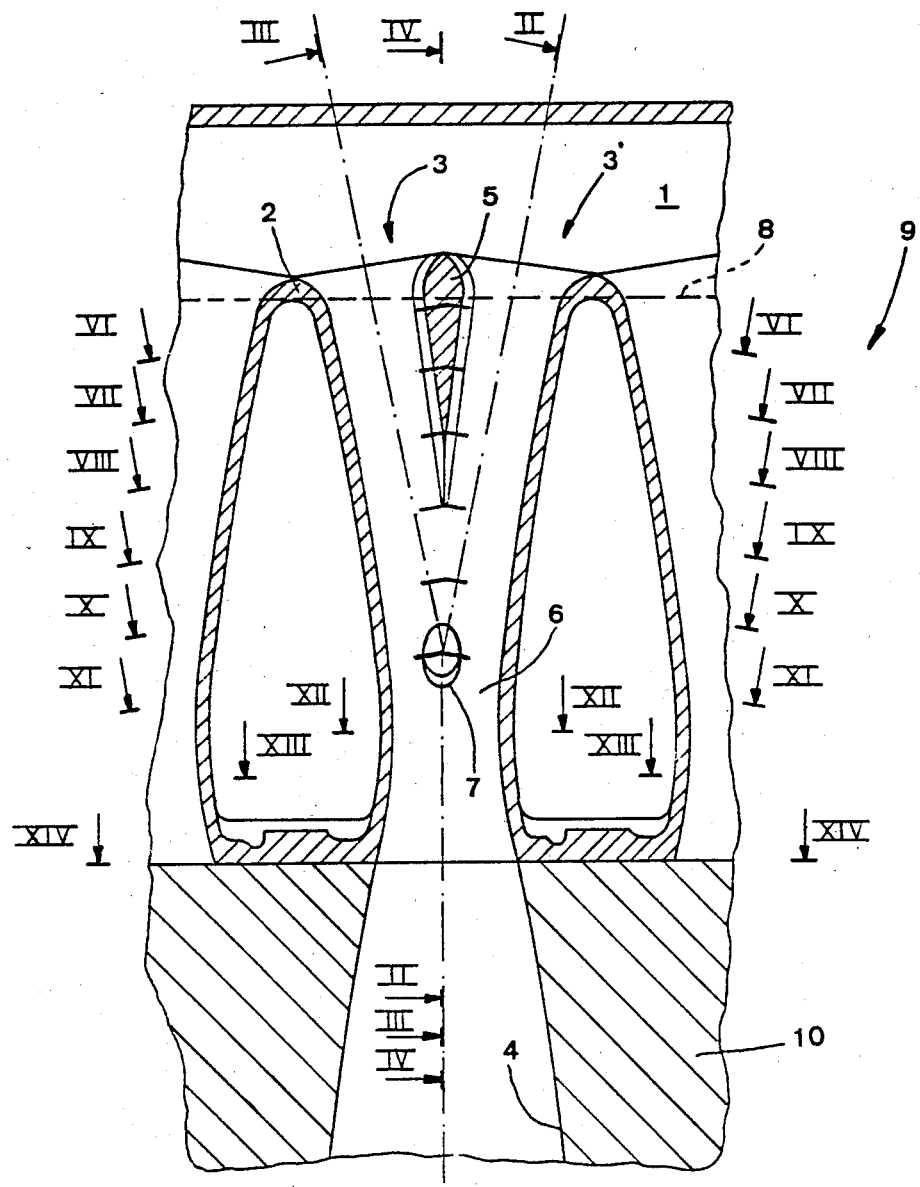
FIG. 1 is the longitudinal section through one of the air-intake and fuel/air mixture passages making up an inlet manifold as described herein.
Figure 4:
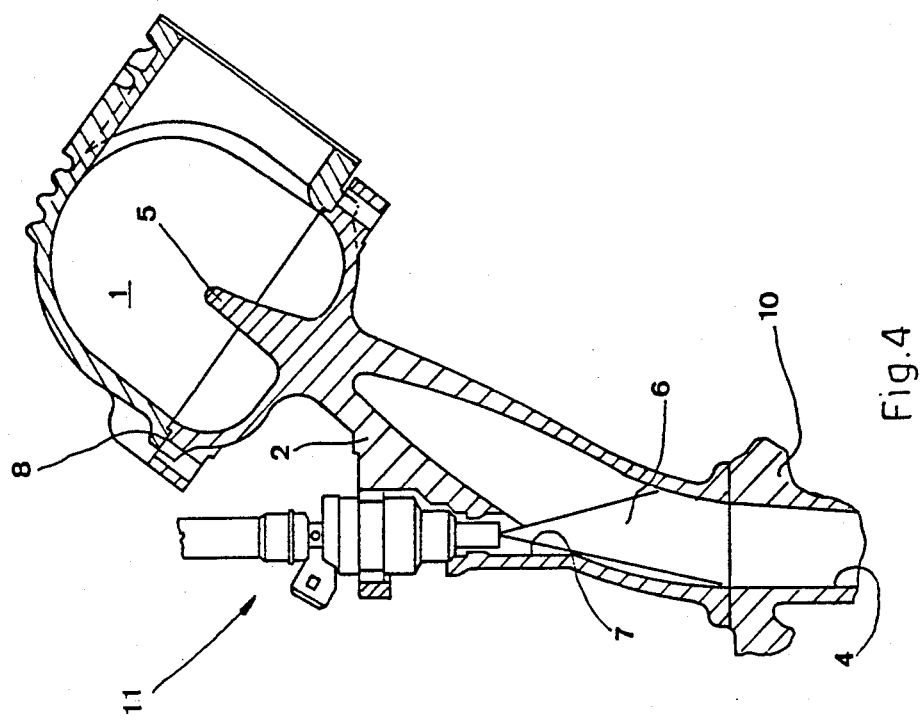
FIG. 4 is the section through IV—IV in FIG. 1 which illustrates the web, or baffle, separating said two divided intake passages.
Figure 5:
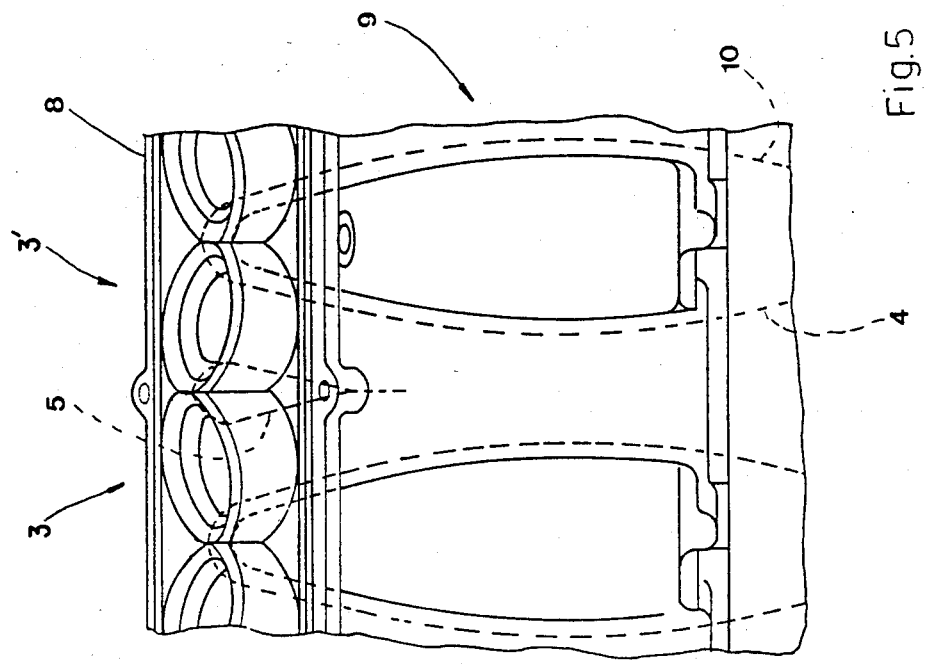
FIG. 5 shows FIG. 4, seen from the right.
Figure 6:
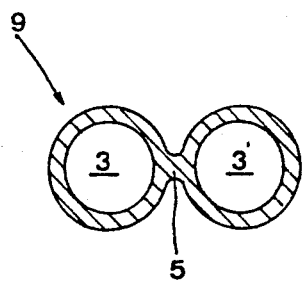
FIGS. 6, 7, 8, 9, 10, 11, 12, 13 and 14 are scaled-down sections through VI—VI, VII—VII, VIII—VIII, IX—IX, X—X, XI—XI, XII—XII, XIII—XIII and XIV—XIV respectively in FIG. 1, which run from top to bottom of the single air intake passage according to the invention.
Figure 7:
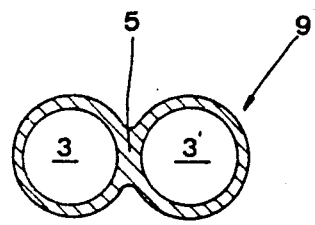
Figure 8:
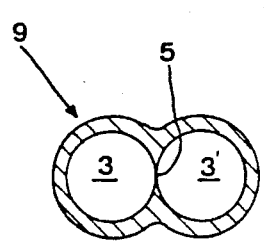
Figure 9:
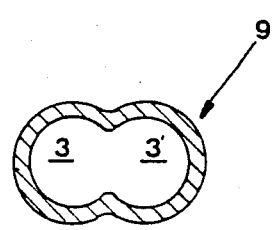
Figure 10:
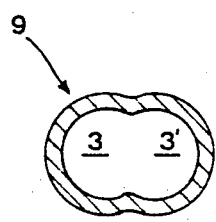
Figure 11:
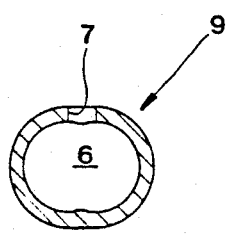

With reference to the drawings, 1 denotes the chamber from where induced or supercharged air enters the various manifold intake passages. 2 denotes the sidewalls of the two divided passages 3 and 3' which take air from the chamber 1 into the mixture passage 4 located in the engine's cylinder head. 5 denotes a web or baffle exhibiting an elongated upturned pear-drop shape when seen in section—the curved part of which offered to the manifold—which separates passage 3 from passage 3' in such a way that the axes of the latter converge toward a restriction 6 where fuel, injected thereinto substantially at a tangent via an opening 7, mixes with air from the manifold. 8 denotes the plane common to flanged mating surfaces which unite the chamber 1 of the manifold to the main manifold casting 9. 10 denotes the cylinder head, and 11 denotes the injector nozzle which squirts fuel (see FIGS. 2, 3 & 4) through the opening 7 aforementioned.

With normal induction, function of the manifold is as follows: air drawn in by the engine from chamber 1 is channelled through the two intake passages 3 & 3' toward a relative cylinder in such a way that the twin streams converge toward restriction 6 where it mixes with fuel injected via opening 7. The slight taper of each passages 3 & 3' enforces acceleration of the divided flow of air, thereby generating and exploiting kinetic energy in order to creat interferences between the twin converging streams, which generates a degree of turbulence ensuring a more thorough mixture of fuel and air and by definition, lower exhaust emission levels. In supercharged engines the chamber 1 supplying air to the cylinders will be pressurised, whilst the principle of the invention and its function remain the same as already described.

When carrying the invention into effect, materials, dimensions, and design and construction details may all differ from those suggested in the description and accompanying drawings whilst remaining equivalent in terms of the art, and by no means straying from within the bounds of protection afforded by appended claims. Further, an inlet manifold according to the invention might be fitted to any internal combustion engine featuring indirect fuel injection, regardless of the number of cylinders and regardless of the number of valves to each head. Similarly, the countersunk profile of each port channelling air into passages 3 and 3'—being dependent on the curvature of the top end of the web, or baffle 5—will be plotted according to the requirements of design from engine to engine.

I claim:

1. An inlet manifold for supercharged internal combustion engines having indirect fuel injection, wherein each cylinder intake section comprises a chamber supplying supercharged air, an intake passage wherein fuel and air are mixed, and a final mixture inlet passage leading to a cylinder and located within a cylinder head, wherein each intake passage is divided by a transverse web or baffle into two symmetrical passages and is tapered forming a restriction located beneath a point where fuel is injected, wherein each symmetrical passage is tapered towards said restriction; axes of said symmetrical passages converging in V-formation down generally to a plane normal to said intake passage containing the point of injection; said transverse web or baffle located at an initial stage of the intake passage and exhibiting an elongated, inverted pear-drop profile in cross-section which ends prior and substantially spaced from said plane.

2. Inlet manifold as in claim 1 wherein each of the divided passages is countersunk at the top according to the curvature of the top end of said web or baffle, and tapers toward said point of injection to a degree of between 3° and 13°.

3. Inlet manifold as in claim 1 wherein an angle separating the axes of said divided passages in converging V-formation down toward said point of injection is between 12° and 30°.

4. An inlet manifold for normal induction internal combustion engines having indirect fuel injection, wherein each cylinder intake section comprises a chamber supplying normally-induced air, an intake passage wherein fuel and air are mixed, and a final mixture inlet passage located within a cylinder head, wherein each intake passage is divided by a transverse baffle into two symmetrical passages and is tapered forming a restriction located beneath a point where fuel is injected, wherein each symmetrical passage is tapered towards said restriction; axes of said symmetrical passages converging in V-formation down generally to a plane normal to said intake passage containing the point of injection; said transverse baffle being located at an initial stage of the intake passage and exhibiting an elongated, inverted pear-drop profile in cross-section which ends prior and substantially spaced from said plane.

5. Inlet manifold as in claim 4 wherein each of the divided passages is countersunk at the top according to the curvature of the top end of said baffle, and tapers toward said point of injection to a degree of between 3° and 13°.

6. Inlet manifold as in claim 4 wherein an angle separating the axes of said divided passages converging in V-formation down toward said point of injection is between 12° and 30°.

* * * * *